United States Patent Office 2,945,036
Patented July 12, 1960

2,945,036

PHTHALAZINIUM COMPOUNDS

Jean Druey, Riehen, and Hans Ulrich Daeniker, Basel, Switzerland, assignors to Ciba Pharmaceutical Products, Inc., Summit, N.J.

No Drawing. Filed Dec. 13, 1957, Ser. No. 702,520

Claims priority, application Switzerland Jan. 10, 1957

17 Claims. (Cl. 260—250)

This invention relates to new quaternary compounds. More particularly the invention concerns 2:2'-R-bis-phthalazinium compounds, in which R indicates a bivalent aliphatic hydrocarbon radical, and the pseudo-bases derived therefrom and their anhydro-compounds, as well as the processes for preparing same.

In the new compounds the phthalazine radicals can be substituted, for example they may also contain condensed rings; they are preferably unsubstituted, however. The aliphatic hydrocarbon radical R is preferably a straight or branched alkylene radical. This alkylene radical preferably contains not more than 30 carbon atoms; alkylene radicals are preferred with 4–10 carbon atoms, such as tetramethylene, hexamethylene or decamethylene.

The new compounds possess bacteriostatic properties, for example against *Staphylococcus aureus*, and can be used as disinfectants or medicaments with antibacterial activity. In addition, they promote immunisatory reactions caused by antigens by intensifying, for example, the anti-body formation. They can accordingly be used, for example, as additions to vaccines.

Of particular value and therefore a specific and preferred embodiment of the invention are the phthalazinium compounds of the formula

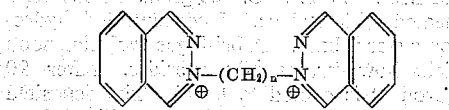

in which $n$ is a whole number of 4–10, preferably 6 or 10, and A is the anion of an acid. Suitable anions, for example, are those of strong inorganic acids, such as the hydrohalic acids, for example hydrochloric, hydrobromic or hydriodic acid, or of sulfuric acid or anions of organic acids such as alkyl sulfonic acids, for example of methane or ethane sulfonic acid, or aryl sulfonic acids, for example p-toluene sulfonic acid or naphthalene sulfonic acid, or of acetic acid, oxalic acid, tartaric acid, citric acid, benzoic acid or naphthalene carboxylic acids, or anions of alkyl sulfuric acids, for example of methyl sulfuric acid.

The new compounds are obtained when compounds of the formula X–R–Y, in which R has the above significance, X is a halogen atom, such as chlorine, bromine or iodine and Y has the same meaning as X or indicates a hydroxyl group, are reacted with phthalazines and resulting mono-phthalazinium compounds, if desired after conversion into a radical X of a radical Y convertible into X, again reacted with phthalazines.

The quaternization reactions are carried out in the presence or absence of solvents, at room temperature or elevated temperature, in open vessels or in closed vessels under pressure.

The conversion of the hydroxyl group into a halogen atom is carried out with halogenating agents, such as thionyl chloride.

Another process for the manufacture of the new compounds consists in that o-phthalaldehydes are reacted with compounds of the formula H₂NHN—R—NHNH₂, if desired in the form of their salts. By this means, by the use of the salts of the bishydrazine compounds, for example the hydrohalides, sulfates or sulfonates, the quaternary bis-phthalazinium salts are produced directly. However, when the bishydrazine compounds are used in free form, the corresponding pseudo-bases are produced, i. e. carbinols of which the formula in the case of an unsubstituted phthalazine compounds can be represented as follows:

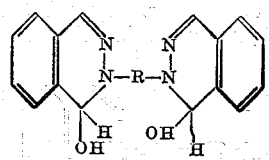

According to the nature of the radical R, these may be capable of splitting off water and thus being converted into the anhydro-compound.

The reaction of the o-phthalaldehydes with the bis-hydrazine compounds takes place in the absence, but preferably in the presence, of diluents, at ordinary or elevated temperature, if desired in a closed vessel under pressure, directly or in stages.

Depending on the reaction conditions, the new compounds are obtained according to the above process as quaternary salts or in the form of the above described pseudo-bases. The salts can be converted by treatment with alkalies, such as alkali carbonates or hydroxides or other suitable metal hydroxides or carbonates, or anion exchangers, into the pseudo-bases or the corresponding anhydro-compounds. From the pseudo-bases or their anhydro-compounds, the corresponding salts can be obtained by treatment with thereapeutically useful acids, such as the hydrohalic acids, sulfuric acid, nitric acid, phosphoric acid, acetic acid, propionic acid, oxalic acid, malic acid, tartaric acid, citric acid, methane sulfonic acid, ethane sulfonic acid, hydroxy ethane sulfonic acid, benzoic acid, methyl or ethyl sulfuric acid, salicylic acid, p-amino-salicylic acid or toluene sulfonic acid. Resulting quaternary salts can be converted into other therapeutically useful salts by treatment with anion exchangers.

The starting materials are in part known; insofar as they are new, they can be prepared by customary methods. The bis-hydrazine compounds required for the reaction of the invention may be obtained by reaction of the corresponding diamines with formaldehyde and hydrocyanic acid, hydrolysis of the resulting condensation product to the bis-glycine derivative, nitrosation, ring closure to the bis-sydnone and decomposition of the latter with acid.

In addition to their use as additions to vaccines, the new compounds can be employed as disinfectants in the form of commercial preparations or as medicaments, for example in the form of pharmaceutical preparations. The latter preparations contain them in admixture with a pharmaceutical organic or inorganic, solid or liquid carrier material suitable for enteral or parenteral administration. For the formation there of such substances are concerned as do not react with the new compounds, as for example water, gelatine, lactose, starch, magnesium stearate, talc, vegetable oils, benzyl alcohols, gums, polyalkylene glycols, cholesterol or other known medicament carriers. The pharmaceutical preparations can be, for example, in the form of tablets, dragees, salves or in liquid form as solutions, suspensions or emulsions. If desired they are sterilized and/or contain auxiliary substances such as preserving, stabilizing, wetting or emulsifying agents, salts for variation of the osmotic pressure or buffer substances. They can also contain other therapeutically valuable substances. The preparations are obtained by customary methods.

The following examples illustrate the invention:

Example 1

10.0 grams of o-phthalaldehyde and 6 grams of 1:2-dihydrazino-ethane dihydrochloride are dissolved in a mixture of 75 cc. of alcohol and 50 cc. of water and boiled under reflux for 5 hours. To the dark colored reaction solution animal charcoal is then added, boiling continued for a further 10 minutes, the liquid filtered and the filtrate evaporated to dryness. The crystalline residue is recrystallized from 400 cc. of alcohol and 11.2 grams obtained of ethylene-bis-phthalazinium chloride of the formula

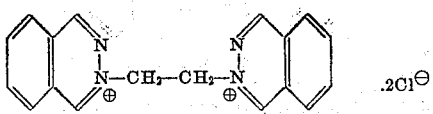

of M.P. 218–220° C. The aqueous solution of this compound is rendered alkaline with sodium carbonate. Anhydro - 2:2' - ethylene - bis - (1 - hydroxy - 1:2 - dihydrophthalazine) of the formula

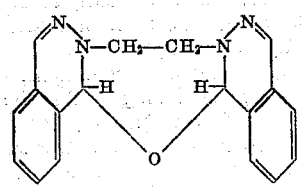

is obtained in colorless needles of M.P. 146–148° C., from which, with acids, ethylene-bis-phthalazinium salts, such as the bromide, iodide, sulfate, nitrate, tartrate etc. can be produced.

For the preparation of the 1:2-dihydrazine-ethane dihydrochloride, the following process is carried out: To a solution of 56 grams of ethylene diamine and 50 grams of hydrocyanic acid in 150 cc. of water is added dropwise at 15–20° C. with stirring, within 75 minutes, a quantity of 160 grams of 37–40% aqueous formaldehyde solution. After a further 30 minutes, 250 cc. of 50% aqueous caustic potash solution are added. The whole is now heated to boiling for 2 hours. Thereupon 400 cc. of water are added and 400 cc. of the solvent distilled off. With simultaneous cooling and stirring, 250 cc. of concentrated hydrochloric acid are now added, the reaction solution cooled to 0° C. and at this temperature, with stirring within 4 hours, a solution of 130 grams of sodium nitrite in 300 cc. of water added dropwise. The product is filtered from a little deposited material and the filtrate subjected to the addition of 250 cc. of concentrated hydrochloric acid, whereupon colorless crystals slowly deposit. After 2 days standing at 0° C., the crystals are filtered with suction, sucked as dry as possible and then recrystallized from 500 cc. of water. 31 grams are obtained of N:N'-dinitroso-N:N'-ethylene-bis-glycine of M.P. 138° C. This product is treated with 800 cc. of acetic anhydride and heated on the steam bath for 3 hours and thereupon left to stand overnight at 0° C. The separated crystals are filtered with suction, washed with some glacial acetic acid and much water and dried. 49.5 grams are obtained of N:N'-ethylene-bis-sydnone, which after recrystallization from much water melts at 170° C. with decomposition. 40 grams of this compound are suspended in a mixture of 25 cc. of water and 300 cc. of about 5 N-methanolic hydrochloric acid and boiled for 4 hours under reflux. The whole is then cooled to 0° C. and the deposited crystals filtered with suction and recrystallized from 600 cc. of 80% aqueous methanol. 15.0 grams are obtained of 1:2-dihydrazino-ethane dihydrochloride of M.P. 157–159° C.

Example 2

7 grams of o-phthalaldehyde and 4.9 grams of 1:4-dihydrazino-butane dihydrochloride are dissolved in a mixture of 75 cc. of alcohol and 50 cc. of water, the solution boiled under reflux for 4 hours and then treated with animal charcoal and filtered after boiling for a further 10 minutes. The filtrate is evaporated to dryness under vacuum and the crystalline residue recrystallized from 200 cc. of alcohol. 8.2 grams are obtained of tetramethylene-bis-(phthalazinium chloride) of the formula

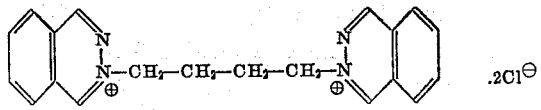

of M.P. 284–285° C.

For the preparation of the starting material, 1:4-dihydrazino-butane dihydrochloride, it is advantageous to proceed as follows: To a solution of 50 grams of putrescine dihydrochloride and 40 grams of potassium cyanide in 200 cc. of water, there are added dropwise at 15–20° C. with stirring 50 grams of a 37–40% aqueous formaldehyde solution. Thereupon 80 cc. of 50% aqueous caustic potash solution are added, the whole boiled under reflux for 3 hours and 300 cc. of water then added. After distilling off 300 cc. of the solvent, 80 cc. of concentrated hydrochloric acid are added and at 0° C., with stirring, a solution of 41 grams of sodium nitrite in 120 cc. of water introduced dropwise. After the addition of a further 80 cc. of concentrated hydrochloric acid, the whole is allowed to stand overnight at 0° C. The crystals filtered off with suction are recrystallized from 600 cc. of water and 52.5 grams obtained of N:N'-dinitroso-N:N'-tetramethylene-bis-glycine of M.P. 140–141° C. This product is dissolved in 500 cc. of acetic anhydride and heated on a steam bath for 3 hours. The whole is then left overnight at 0° C. and the deposited crystals filtered with suction and washed well with water whereby 31 grams are obtained of N:N'-tetramethylene-bis-sydnone of M.P. 168–170° C. 20 grams of this compound are heated with 100 cc. of concentrated hydrochloric acid on a steam bath. A brisk gas evolution soon follows, which, however, rapidly subsides. After 90 minutes the product is cooled to 0° C. The deposited crystals are filtered with suction and recrystallized from 230 cc. of 85% aqueous methanol. 11.8 grams are obtained of 1:4-dihydrazino-butane dihydrochloride of M.P. 156–158° C.

Example 3

9.8 grams of o-phthalaldehyde and 8 grams of 1:6-dihydrazino-hexane dihydrochloride are dissolved in 160 cc. of alcohol-water (5:3 parts by volume) and the solution boiled for 5 hours under reflux, treated with animal charcoal, boiled for a further 10 minutes and then filtered. The filtrate is evaporated to dryness. The solid residue is crystallized from 200 cc. of absolute alcohol-ether 1:1 and 9.5 grams obtained of hexamethylene-bis-(phthalazinium chloride) of the formula

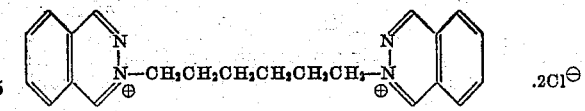

of M.P. 240° C.

For the preparation of the starting material, 1:6-dihydrazino-hexane dihydrochloride, it is advantageous to proceed as follows: To a solution of 107 grams of 1:6-diaminohexane and 50 grams of hydrocyanic acid in 300 cc. of water are added dropwise at 15–20° C. with stirring 150 grams of 37–40% aqueous formaldehyde solution. After the addition of 250 cc. of 50% aqueous caustic potash solution, the whole is boiled for 3 hours under reflux. Then 500 cc. of water are added and 500 cc. of the solvent distilled off. After the addition of 250 cc. of concentrated hydrochloric acid, there is added dropwise at 0° C. with stirring, a solution of 120 grams of sodium nitrite in 200 cc. of water, a further 250 cc. of concentrated hydrochloric acid then added and the whole allowed to stand at 0° C. The deposited crystals are filtered with suction and recrystallized from 1 liter of water. 238 grams are obtained of N:N'-dinitroso-N:N'-hexamethylene-bis-glycine of M.P. 123° C. 27 grams of this compound are suspended in 250 cc. of anhydrous methylene chloride and while cooling with ice 100 cc. of trifluoracetic anhydride added. The reaction solution is now boiled under reflux for 1 hour and the solvent then distilled off The oily residue is dissolved in 150 cc. of chloroform and the solution treated with 300 cc. of water. Crystallization takes place after a short time. The filtered crystals are recrystallized from alcohol and 20.4 grams obtained of N:N'-hexamethylene-bis-sydnone of M.P. 114–116° C. 25 grams of this compound are treated with 125 cc. of concentrated hydrochloric acid and heated for 2 hours on a steam bath. By cooling to −10° C. crystals are obtained which are recrystallized from 100 cc. of methanol. 11.2 grams are obtained of 1:6-dihydrazino-hexane dihydrochloride of M.P. 139–141° C.

*Example 4*

13.0 grams of phthalazine and 15.0 grams of 1:10-dibromodecane are dissolved in 250 cc. of acetonitrile and the solution boiled under reflux for 48 hours. It is then allowed to stand overnight at 0° C. and the deposited crystals filtered with suction. 25.7 grams are obtained of decamethylene-bis-(phthalazinium bromide) of the fomula

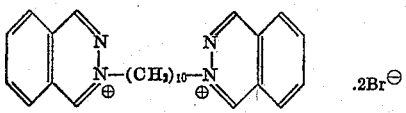

of M.P. 182–183° C.

*Example 5*

13.0 grams of phthalazine and 9.5 grams of ethylene bromide are dissolved in 100 cc. of acetonitrile and boiled under reflux for 24 hours. After cooling, the deposited crystals are filtered with suction and recrystallized from alcohol. There is obtained pure ethylene-bis-(phthalazinium bromide) of the formula

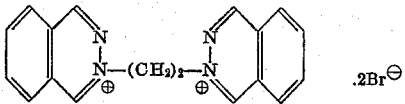

melting at 277–278° C., from which anhydro-2:2'-ethylene-bis-(1-hydroxy-1:2-dihydro-phthalazine) can be prepared as described in Example 1.

*Example 6*

26 grams of phthalazine and 16 cc. of ethylene chlorhydrin in 150 cc. of absolute toluene are boiled under reflux for 10 hours. The whole is then cooled to 0° C. and the deposited crystals filtered with suction. The so obtained β-hydroxy-ethyl-phthalazinium chloride of the formula

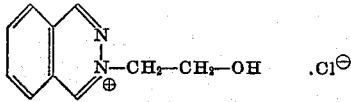

melting at 232–234° C. can be recrystallized from alcohol, if desired. 5.0 grams of the crude compound are boiled in 50 cc. of thionyl chloride for 2 hours under reflux. The solution is then evaporated to dryness in vacuo and the remaining crystals are recrystallized from a mixture of absolute alcohol and ether. There is obtained β-chlorethyl-phthalazinium chloride of the formula

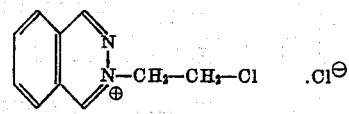

in the form of hygroscopic crystals melting at 178–179° C. (with decomposition). 2.3 grams of this compound are dissolved with 1.3 grams of phthalazine in 50 cc. of acetonitrile. The solution is boiled for 14 hours under reflux and then cooled to 0° C. The deposited crystals are filtered with suction and recrystallized from alcohol. There are obtained colorless crystals melting at 218–220° C. which are identical as regarding melting point and mixed melting point with the ethylene-bis-(phthalazinium chloride) obtained according to Example 1.

*Example 7*

2.1 grams of β-hydroxy-ethyl-phthalazinium chloride obtained as described in Example 6 are mixed with 20 cc. of aqueous hydrobromic acid of 48% strength and heated in a sealed tube for 20 hours at 180° C. The solution is then evaporated to dryness under reduced pressure. A dark colored oil is obtained which after the addition of a little acetone forms a crystal cake. The latter is recrystallized from a mixture of alcohol and ether and there is obtained β-bromethyl-phthalazinium bromide of the formula

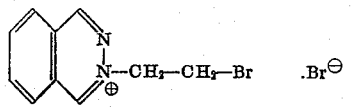

melting at 155° C. (with decomposition). 1.0 gram of this compound is boiled with 0.4 gram of phthalazine in 20 cc. of acetonitrile for 6 hours under reflux. The mixture is then cooled, the deposited crystals are filtered with suction and recrystallized from alcohol. There is so obtained ethylene-bis-(phthalazinium bromide) melting at 273–274° C. (with decomposition) which in the mixed melting point test is shown to be identical with the product obtained in Example 5.

What is claimed is:

1. A member selected from the group consisting of quaternary 2:2'-R-bis-phthalazinium salts, wherein the quaternary ammonium anion is an anion of a therapeutically acceptable acid, wherein R is a saturated alkylene radical having at most 30 carbon atoms, and the pseudo-bases derived therefrom and their anhydro compounds.

2. Quaternary 2:2'-hexamethylene-bis-(phthalazinium salts), wherein the quaternary ammonium anion is an anion of a therapeutically acceptable acid.

3. Quaternary 2:2'-decamethylene-bis-(phthalazinium salts), wherein the quaternary ammonium anion is an anion of a therapeutically acceptable acid.

4. Quaternary 2:2'-tetramethylene-bis-(phthalazinium salts), wherein the quaternary ammonium anion is an anion of a therapeutically acceptable acid.

5. A member selected from the group consisting of quaternary 2-X-R-phthalazinium salts, wherein the quaternary ammonium anion is an anion of a therapeutically acceptable acid, wherein X is a halogen atom selected from the group consisting of chlorine, bromine and iodine and R a saturated divalent aliphatic hydrocarbon radical having at most 30 carbon atoms, and the pseudo-bases derived therefrom.

6. Quaternary 2 - (β - chlorethyl) - phthalazinium salts, wherein the quaternary ammonium anion is an anion of a therapeutically acceptable acid.

7. A member selected from the group consisting of quaternary 2-HOR-phthalazinium salts, wherein the quaternary ammonium anion is an anion of a therapeutically acceptable acid, wherein R is a saturated divalent aliphatic hydrocarbon radical having at most 30 carbon atoms, and the pseudo-bases derived therefrom.

8. Quaternary 2-(β-hydroxyethyl)-phthalazinium salts, wherein the quaternary ammonium anion is an anion of a therapeutically acceptable acid.

9. The pseudo-bases of the compound claimed in claim 1.

10. The anhydro compounds of the pseudo-bases claimed in claim 2.

11. Compounds of the formula

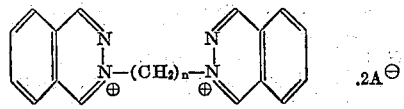

wherein $n$ is a whole number of 4–10 and A the anion of a therapeutically acceptable acid.

12. 2:2′-hexamethylene-bis-(phthalazinium chloride).
13. 2:2′-decamethylene-bis-(phthalazinium bromide).
14. 2:2′-tetramethylene-bis-(phthalazinium chloride).
15. 2-(β-chlorethyl)-phthalazinium chloride.
16. 2-(β-chlorethyl)-phthalazinium bromide.
17. 2-(β-hydroxyethyl)-phthalazinium chloride.

References Cited in the file of this patent

Gabriel et al.: Berichte Deutsche Chemische Gesellschaft vol. 28, pp. 1830–1835 (1895).